May 20, 1930.  L. C. BLACK  1,759,089
TRANSMISSION CHAIN
Filed April 9, 1928
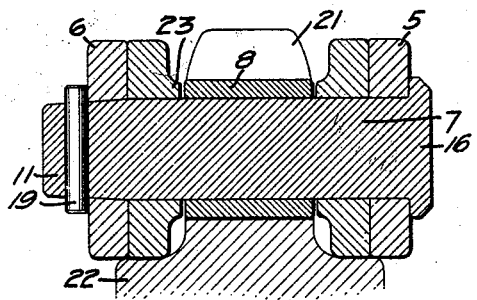
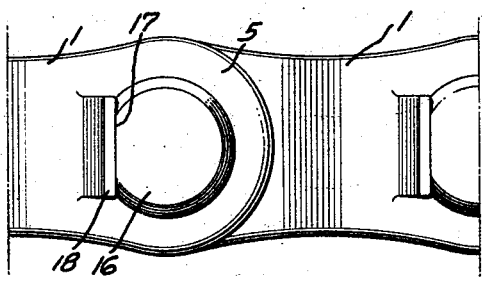
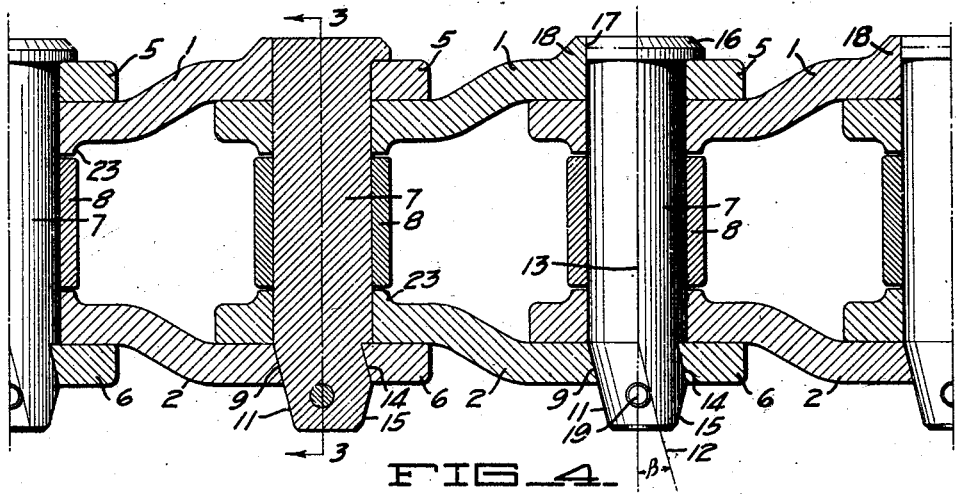
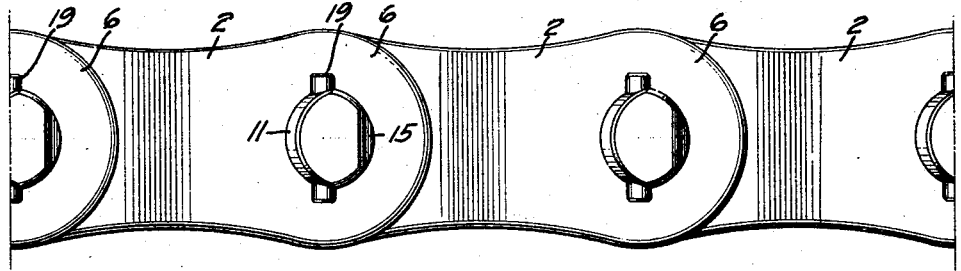
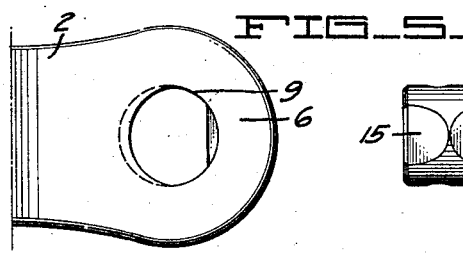
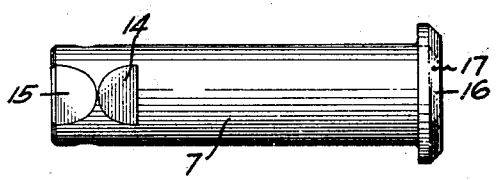
INVENTOR
Lester C. Black
BY
ATTORNEYS Patented May 20, 1930

1,759,089

UNITED STATES PATENT OFFICE

LESTER C. BLACK, OF LOS ANGELES, CALIFORNIA

TRANSMISSION CHAIN

Application filed April 9, 1928. Serial No. 268,533.

My invention relates to heavy duty transmission chains of both the roller type and the solid type. Transmission chains customarily consist of a plurality of pairs of side bars interconnected by means of pins passing thru eyes at the ends of the side bars. In the past, considerable difficulty has been experienced by a tendency of the side bars to spread apart. This is due to several causes, principally either to a deflection, or bending of the connecting pins, or to the wedging action of the sprocket teeth between the side bars. Various means of securing the connecting pin in place are employed one of which consists of a long rivet running longitudinally thru the center of the pins and having a head on either end. This construction has not proved entirely satisfactory, due to the fact that if a sufficiently large rivet is used to be effective, the longitudinal hole passing thru the pin must be of such a large diameter that the pin virtually becomes a tube and bends excessively under load.

In practically all heavy duty roller type transmission chains the side bars are connected at the back eye by a bushing which operates to lend rigidity to the chain and also to furnish a large bearing on the pins to prevent wear. Although the use of bushings in connecting side bars of roller type chains furnishes a greater bearing area between the side bars and the pin, this construction is of necessity rather expensive.

In general it is the object of this invention to provide a connection between the side bars of a transmission chain and its connecting pin such that when the chain is subjected to a tension strain the side bars of the chain will be urged inwardly or toward each other.

Another object of this invention is the provision of a connecting means between side bars of a transmission chain and its connecting pin, that will not weaken the connecting pin and that will urge the side bars inwardly or toward each other when the chain is subjected to a tension strain.

Another object of this invention is the provision of a connection between the side bars of a transmission chain and its connecting pin, such that the engaging faces of these members which are subjected to a strain when the transmission chain is under tension will make such an angle with the length of the chain that the force placing the chain under tension is resolved into two components, one acting along the length of the chain and the other acting at right angles to the length of the chain and urging the side bars of each link inwardly and toward each other.

Another object of this invention is the provision of a roller type transmission chain in which the bearing area between the side bars and the connecting pin is materially increased without the use of a bushing and which at the same time may be used with a standard sprocket wheel.

The invention possesses other advantageous features, some of which with the foregoing, will be set forth at length in the following description where I shall outline in full that form of my invention which I have selected for illustration in the drawings accompanying and forming part of the present specification. In said drawings I have shown one form of my invention, but it is to be understood that I do not limit myself to such form, since the invention as set forth in the claims, may be embodied in a plurality of forms.

Referring to the drawings:

Fig. 1 is a partial elevational view of a roller type transmission chain embodying my invention.

Fig. 2 is a horizontal mid section of the chain shown in Fig. 1.

Fig. 3 is a transverse vertical section taken on the line 3—3 of Fig. 2.

Fig. 4 is an elevational view of the chain showing the side opposite to the side shown in Fig. 1.

Fig. 5 is a detail view of the front end of a side bar showing the angle which the eye takes in passing thru the side bar.

Fig. 6 is a detail view of the connecting pin.

In general my transmission chain consists of a plurality of pairs of outer and inner side bars 1 and 2, the rear end of each pair being inwardly offset so as to be overlapped by the front end of the next succeeding pair of side bars. The ends of these side bars are provided with eyes which are adapted to be placed in registration and thru which pins 7 are adapted to be inserted in order to hold the chain in its assembled position. A roller 8 is carried by the pin 7 intermediate the inner faces of the rear ends of the side bars.

In order to urge the side bars of each link inwardly when the same is subjected to a tension strain I preferably construct the eye 9 in the front end 6 of the inner side bars 2 as follows. By construction, the eye 9 is complementary to the surfaces of the inner end 11 of the pin 7 and may therefore be defined in terms of this outer end of the pin. Beginning at a plane determined by the engaging faces of any two adjacent side bars 2, the axis 12 of the ends of the pin are made to make a substantial angle with the axis 13 of the body of the pin and it preferably makes an angle of the order of 10 degrees. The form of the ends of the pins is that of a circular cylinder with the exception of a flat notch 14 the plane of which is parallel with the axis 12 and perpendicular to the plane of the paper, and a tapered portion 15. The notch 14 and tapered portion 15 intersect at a point lying on a plane determined by the outer forward face of the side bars 2. The contour of the eyes 9 is therefore defined by that portion of the surface of the ends of the pins lying between the planes defined by the outer and inner faces of the forward ends of the side bars 2. Since the force placing the side bars of the chain under tension is transmitted in part to each link thru the engagement of the notched surface 14 of the pins 7 and the complementary surface of the eye 9 it will be seen that due to the fact that these engaging surfaces make an angle with the axis 13 of the body of the pin and therefore with the length of the chain, this force will be resolved into two components, one along the length of the chain and one perpendicular to the length of the chain. This latter component urges the forward ends of the side bars inwardly and increases as the force placing the chain under tension is increased. The outer ends of the pins are provided with heads 16 having flat portions 17 adapted to engage outwardly extending lugs or lips 18 made integral with the forward ends 5 of the outer side bars and thereby prevent relative rotation between side bars and pins. Cross pins 19 passing thru the inner ends of the connecting pins serve to retain each link in its assembled position. If found necessary both ends of the connecting pin may be provided with the notched surfaces 14 but for practical purposes it has been found that the provision of this construction on one end of the pin is sufficient.

In assembling the chain, the pin 7 is inserted through the outer side bars 1 of the adjacent links and through the roller 8 until the tapered portion 15 engages the inner side bar 2 through which it readily passes. When the pin meets the eye 9 in the front end 6 of the other inner side bar, the two links are constrained together. The tapered portion on the pin passes on through the eye, the passage being permitted by the spring present in the links and by virtue of the clearance ordinarily present, until the notch 14 engages its cooperating surface when the links move away from each other.

As best shown in Fig. 3 the teeth 21 of a standard sprocket wheel 22 are constructed of a width which is considerably less than the width of the wheel itself. By taking advantage of this construction a heavy duty transmission chain of the roller type has been constructed without the use or necessity of the bushings usually used to connect the rear ends of the side bars. This has been accomplished by forming inwardly extending bosses 23 on the inner faces of the rear ends of the side bars. By so increasing the width of the side bars at this point the bearing surfaces between the connecting pins and side bars are increased but at the same time leave sufficient space between the faces of the bosses to accommodate a roller having a length corresponding to the width of standard sprocket teeth.

Although the pin construction which I have used has been shown only as applied to the roller type of transmission chain it can be readily seen that no change whatsoever is necessitated in applying it to the solid type of chain, the only difference in the links being that the roller 8 in the solid type is made integral with the side bars thereby serving as a continuous bearing for the connecting pin 7.

By varying the angle $\beta$ which is also a measure of the angle made by the notch 14 with the axis of the pin 13, the lateral component of the force producing the tension on the chain may be changed at will.

From the above disclosure it will be seen that I have provided a transmission chain, the construction of which avoids the necessity of passing any hole whatsoever longitudinally thru the pins thereby retaining their full strength and the pins have been so constructed that they cooperate with the side bars to urge the side bars inwardly when the chain is subjected to a tension strain. Advantage has been taken of the construction of a standard sprocket wheel in so constructing the links of a transmission chain that the necessary bearing surfaces have been provided between the connecting pins and the rear faces of the eyes in the rear ends of the side bars without the necessity of the bushings usually used thereby materially decreasing the cost of manufacturing such chains.

I claim:

1. A transmission chain comprising a plurality of link members, each of which includes a pair of side bars, pins pivotally connecting adjacent link members and means on said pins for urging the side bars of each pair toward each other and for securing said pins non-rotatably to said side bars when the chain is under tension.

2. A transmission chain comprising a plurality of link members each of which includes a pair of side bars, removable pins for connecting said links, said pins and links being provided with cooperating inclined planes whereby the bars of each link are urged together and the pins are non-rotatably held with respect to the bars when the chain is placed under tension.

3. A transmission chain comprising a plurality of link members each of which includes a pair of side bars, removable pins for connecting said links, one end of each of said pins being provided with an inclined plane and an inclined plane formed by an aperture in one bar of each pair of said bars, the inclined planes of corresponding pins and bars cooperating to urge the side bars of each pair of side bars together when said chain is placed under tension and to position the pin non-rotatably within said aperture.

4. A transmission chain of the character described comprising a plurality of links each of which includes a pair of side bars, said side bars having a plurality of apertures in their opposite ends, and pins for connecting said links, said pins having end portions over which said apertured side bars can be passed, the end portion of each of said pins being formed with a surface inclined to the longitudinal axis of the pin, said surface co-operating with an inclined surface in one of the apertures whereby the side bars are urged together upon the tensioning of the chain.

5. A transmission chain of the character described comprising a plurality of links each of which includes a pair of side bars, said side bars having a plurality of apertures in their opposite ends, the axis of one of said apertures being angularly inclined with respect to the side bar and to the axes of the other apertures, and a pin for joining said links together comprising a rod adapted to be inserted and removed from the apertures in said side bars, said rod having a portion angularly inclined with respect to the longitudinal axis of the rod, said angularly inclined portion being adapted to abut the inclined aperture in said side bar whereby said side bars are urged together when the chain is under tension.

6. A transmission chain of the character described comprising link members each of which includes a pair of side bars, said side bars having a plurality of apertures at their opposite ends, and a pin insertable through said apertures to join said links, said pin having an end portion, the axis of said end portion being angularly inclined with respect to the longitudinal axis of the pin, said end portion contacting with one of said apertures to urge said side bars together upon the tensioning of the chain.

7. A transmission chain of the character described comprising a link, a pin adapted to engage said link, co-operating surfaces on said pin and said link for constraining said pin against movement longitudinally of said link, a second link, and co-operating inclined surfaces on said pin and said second link for causing relative longitudinal approaching and retreating movement of said links upon transverse movement of said pin.

8. A transmission chain of the character described comprising a pair of co-operating links and a pin adapted to engage said links, said pin having inclined surfaces bearing upon said links whereby said links are first constrained to approach each other longitudinally and then are constrained to retreat from each other longitudinally upon transverse engaging movement of said pin.

In testimony whereof, I have hereunto set my hand.

LESTER C. BLACK.